United States Patent [19]
Rizzo

[11] Patent Number: 6,049,605
[45] Date of Patent: Apr. 11, 2000

[54] TELEPHONE LINE ACCESS ARRANGEMENT

[75] Inventor: Daniel J. Rizzo, Crystal Lake, Ill.

[73] Assignee: Zenith Electronics Corporation, Glenview, Ill.

[21] Appl. No.: 08/866,611

[22] Filed: May 30, 1997

[51] Int. Cl.[7] .................................................. H04M 1/00
[52] U.S. Cl. ........................ 379/399; 379/372; 379/140; 379/93.09
[58] Field of Search .............................. 379/93.09, 93.14, 379/199, 140, 133, 200, 399, 372, 373

[56] References Cited

U.S. PATENT DOCUMENTS 5,499,287  3/1996  Campbell et al. ......................... 379/67
5,535,265  7/1996  Suwandhaputra ......................... 379/97

Primary Examiner—N. Le
Assistant Examiner—Shih-Wen Hsieh

[57] ABSTRACT

A telephone line access arrangement for a telephone instrument and a modem gives priority to the telephone instrument in all instances. A microprocessor controls the modem and receives an input signal that is indicative of the existence of an off hook state for the telephone instrument. Logic device generates the input signal based upon the different electrical conditions characterizing the telephone instrument and the modem.

4 Claims, 1 Drawing Sheet

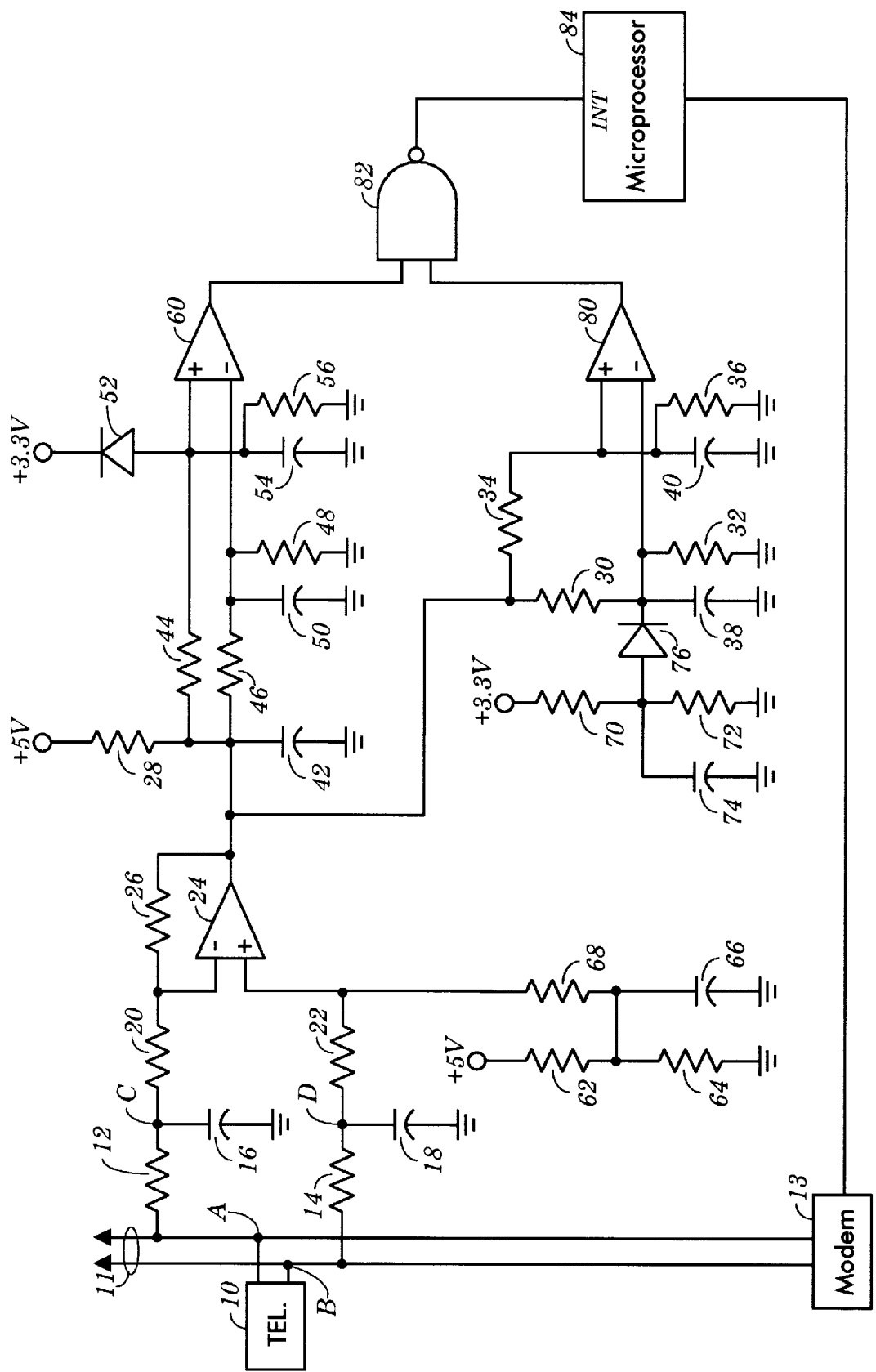

TELEPHONE LINE ACCESS ARRANGEMENT

BACKGROUND OF THE INVENTION AND PRIOR-ART

This invention relates generally to telephone line access systems and particularly to a telephone line access system including a telephone and a modem for use with a single telephone line.

With the rapid proliferation of devices that rely upon a telephone line to convey or receive information, such as computer modems, facsimile machines, data transfer systems, etc., the need for some means to regulate "traffic" on the telephone line has become apparent. In a home environment, there may only be a single telephone line available and that telephone line must have priority in the event the telephone is required in an emergency situation.

Recently, so called "set top boxes" are being used in conjunction with television receivers to communicate, via a telephone line, data to television service providers. That use is the impetus for the present invention, although the invention will find utility in controlling access to any telephone line that is accessible by a telephone and a modem type device. As will be seen, with the system of the invention, the telephone is granted priority in accessing the telephone line and the modem is secondary thereto.

OBJECTS OF THE INVENTION

A principal object of the invention is to provide an novel telephone line access arrangement.

A further object of the invention is to provide a telephone line access arrangement that gives priority to a telephone.

Another object of the invention is to provide a system for controlling access to a telephone line by a telephone and a modem.

BRIEF DESCRIPTION OF THE DRAWINGS

These and other objects and advantages of the invention will be apparent upon reading the following description in conjunction with the drawings, the single FIGURE of which is a schematic diagram of a telephone line access arrangement constructed in accordance with the invention.

DESCRIPTION OF THE PREFERRED EMBODIMENT

Referring to the single FIGURE of the drawings, a telephone instrument 10 is coupled to a telephone line 11. The junctions with telephone line 11 are identified by the letters A and B. A modem 13 is also connected to terminals A and B. Terminals C and D are isolated from the telephone line by means of a pair of isolating resistors 12 and 14 and are bypassed to ground by means of a pair of capacitors 16 and 18. Another pair of isolating resistors 20 and 22 couple junctions C and D, respectively, to the inputs of an attenuator 24. The positive terminal of attenuator 24 is at a positive potential by virtue of its being connected, through a resistor 68, to the junction of a voltage divider consisting of a pair of resistors 62 and 64 connected between a +5.0 volts DC source and ground. Resistor 64 is bypassed to ground by a capacitor 66. Attenuator 24 is simply an operational amplifier, having its negative input terminal coupled to its output terminal via a resistor 26, that is operated with less than unity gain. The purpose of the isolating resistors 12, 14, 20 and 22 is to comply with requirements concerning the connection of devices to telephone line 11 and setting the attenuation of operational amplifier 24.

The output terminal of attenuator 24 is bypassed to ground through a capacitor 42; is connected through a resistor 46 to the negative terminal of a first comparator 60; and through a resistor 34, is connected to the positive terminal of a second comparator 80. A different reference potential is applied to the other inputs of each of comparators 60 and 80. With respect to comparator 60, a +5.0 volts DC potential is supplied through a resistor 28 to a first pair of voltage dividers, one consisting of a resistor 44 in series with a resistor 54 and the other consisting of resistor 46 in series with a resistor 48. Resistor 54 is bypassed to ground by a capacitor 56 and resistor 48 is bypassed to ground by a capacitor 50. It will be noted that the positive terminal of comparator 60 is connected to the junction of resistors 44 and 54 of one voltage divider and the negative terminal of comparator 60 is connected to the junction of resistors 46 and 48 of the other voltage divider. Further, the positive terminal of comparator 60 is connected to the anode of a diode 52, the cathode of which is coupled to a +3.3 volts DC source. The output of comparator 60 is applied to one input of a threshold NAND gate 82.

A similar circuit is used with comparator 80. A second pair of voltage dividers is supplied from the +5.0 volts DC coupled through resistor 28. The first of this second pair of voltage dividers consists of a resistor 30 and a resistor 32 (that is bypassed to ground via a capacitor 38) and the second consists of a resistor 34 and a resistor 36 (that is bypassed to ground by a capacitor 40). The positive terminal of comparator 80 is connected to the junction of resistors 34 and 36 and the negative terminal of comparator 80 is connected to the junction of resistors 30 and 32. A reference potential is also applied to the negative terminal of comparator 80 by means of its connection to the cathode of a diode 76. The anode of diode 76 is connected to the junction of another voltage divider consisting of a pair of resistors 70 and 72 (bypassed to ground by a capacitor 74), connected between a +3.3 volts DC source and ground. The output of comparator 80 is applied to the other input of NAND gate 82.

The output of threshold NAND gate 82 is coupled to the interrupt input of a microprocessor 84 that is coupled to modem 13 for controlling its operation. It will be appreciated by those skilled in the art that a separate modem and microprocessor is not required and in many installations, the modem device will either include a microprocessor for controlling its operation or suitable logic circuitry.

Those skilled in the art will also recognize that the leads of a telephone line are identified by TIP and RING designations and that it often happens that the leads are reversed at some point in the system. Therefore, since the polarity of a particular pair of telephone leads may be unknown, the arrangement of the invention operates for either polarity combination that may exist. If the polarity of the telephone leads were guaranteed, there would not be a need for the redundant circuitry (comparator 80) described.

In operation, either the telephone instrument or the modem may be placed into use at any time and the inventive arrangement will determine this fact and prioritize the system so that the telephone instrument going "off hook", i.e., being placed in operation will result in a signal to keep the modem from being placed on-line or, if the modem is already on-line, to cause it to release the telephone line. In this way, the telephone instrument is never unavailable to a user in an emergency situation.

The detection of an off hook state for the telephone instrument and an on-line condition for the modem occurs as follows. With telephone line 11 connected with a polarity such that its TIP lead is connected to junction B and its RING lead is connected to junction A and both modem 13 and external telephone 10 on hook or inactive, the output of operational amplifier 24 will be about 4.6 volts. This makes the output of comparator 60 low and the outputs of comparator 80 and NAND gate 82 high. If either telephone 10 or modem 13 goes off hook, i.e., is activated, the outputs of comparators 60 and 80 are both high and cause the output of NAND gate 82 to be low. If modem 13 is on-line or activated (the output of NAND 82 is low) and telephone 10 is picked up (activated), the output of comparator 60 will go low and the output of comparator 80 will remain high. This causes the output of NAND 82 to go high until capacitor 56 discharges. The resulting pulse is coupled to the interrupt on microprocessor 84 that responds by telling modem 13 to go on hook, i.e., become inactive. When telephone 10 goes off hook, the output of NAND 82 goes high and modem 13 will be available for use if required.

In the alternate polarity telephone connection, with the TIP lead connected to terminal A and the RING lead connected to terminal B, and both the modem and telephone being inactive or on hook, the output of operational amplifier 24 will be about 5.0 volts. This renders the output of comparator 80 low and the outputs of comparator 60 and NAND 82 high. If either telephone 10 or modem 13 goes off hook, both the outputs of comparators 60 and 80 will be high causing the output of NAND to be low. If modem 13 is on-line (output of NAND 82 low), and telephone 10 goes off hook, the output of comparator 80 goes low while that of comparator 60 remains high, which causes the output of NAND 82 to go high until capacitor 40 discharges. Thus it is seen that the system operates to maintain the priority of the telephone over the modem in all situations regardless of the polarity of the particular hook up of the telephone line.

What has been described is a novel arrangement for allocating access to a telephone line between a telephone instrument and a modem such that the telephone instrument has priority and is never denied access to the telephone line. This is accomplished without interference because the modem, if on-line when the telephone instrument goes off hook, immediately goes off-line and will not attempt to go on-line if the telephone instrument is off hook. It is recognized that numerous changes in the described embodiment of the invention will be apparent to those skilled in the art without departing from its true spirit and scope. The invention is to be limited only as defined in the claims.

What is claimed is:

1. A telephone line access arrangement comprising:
    a telephone instrument adapted to be connected to a telephone line;
    a modem adapted to be connected to said telephone line, said telephone instrument and said modem being characterized by different electrical conditions;
    detection means, including logic means and a gate controlled by said logic means, for determining when said telephone instrument is in an off hook state from said different electrical conditions; and
    means for controlling operation of said modem coupled to receive the output of said gate;
    said controlling means, responsive to the occurrence of said off hook state, connecting said telephone instrument to said telephone line and disconnecting said modem, if said modem is connected to said telephone line.

2. The arrangement of claim 1, wherein said controlling means comprises a microprocessor.

3. The arrangement of claim 2, wherein said logic means includes:
    an attenuator for reducing the voltage levels associated with said different electrical conditions;
    a reference source of voltage; and
    a comparator having one input coupled to said attenuator, another input coupled to said reference source of voltage, and an output coupled to said gate.

4. The arrangement of claim 3, wherein the telephone line may have either of two polarities, and further including:
    a second comparator and a second reference voltage; and
    said second comparator having an input coupled to said attenuator, an input coupled to receive said second reference voltage and an output coupled to said gate.

* * * * *